Dec. 5, 1967  T. W. WALDROP  3,355,865
FORAGE HARVESTER
Filed June 30, 1965
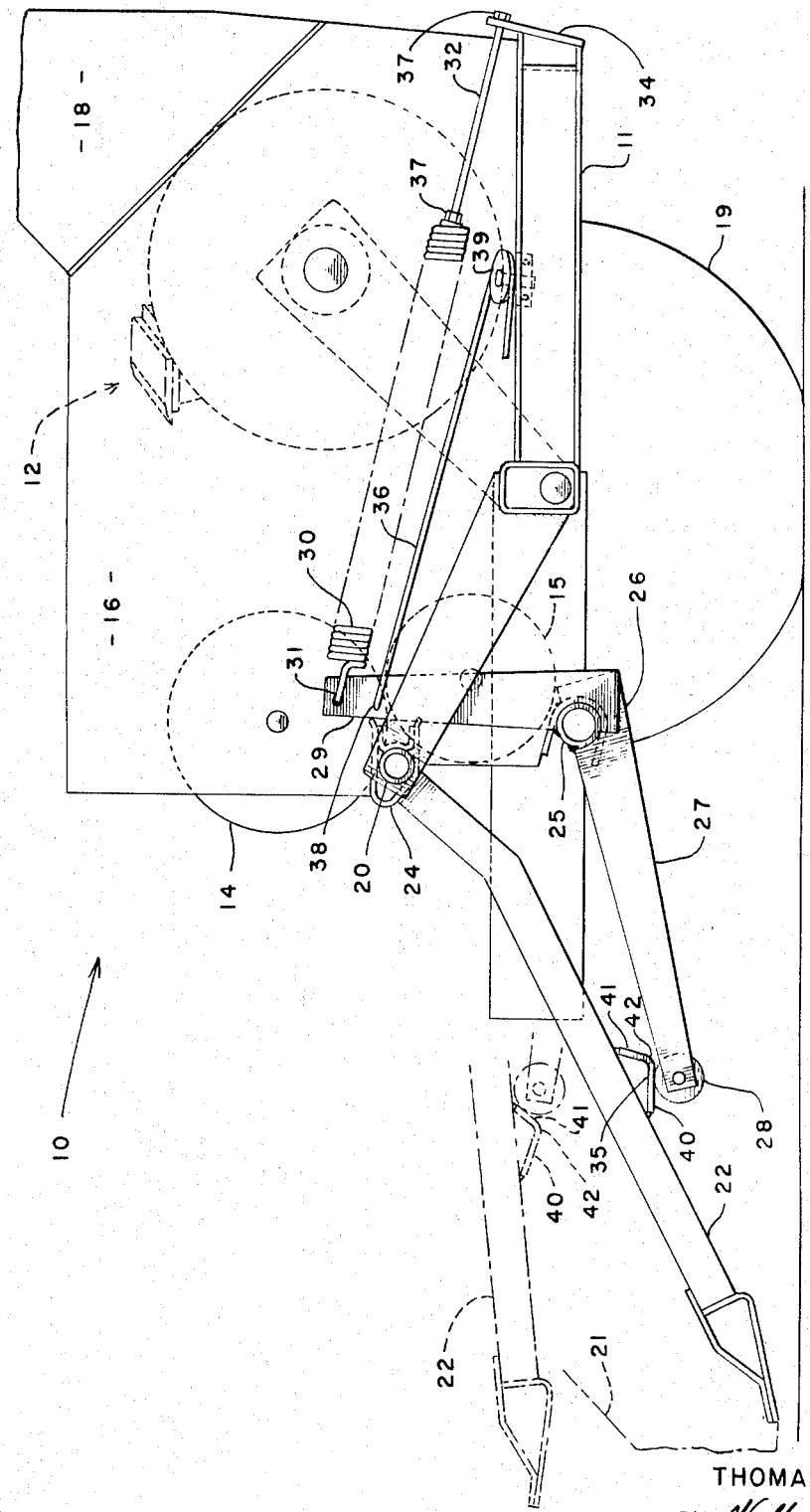
INVENTOR.
THOMAS W. WALDROP
BY *Walter V. Wright*
AGENT

3,355,865
FORAGE HARVESTER
Thomas W. Waldrop, Ronks, Pa., assignor to Sperry Rand Corporation, New Holland, Pa., a corporation of Delaware
Filed June 30, 1965, Ser. No. 468,334
5 Claims. (Cl. 56—208)

This invention relates generally to agricultural machines or the like. More particularly, it relates to means for controlling and adjusting the position of header units on harvesters or like agricultural machines.

Forage harvester implements, for example, are comprised of a main, or base, unit and a variety of different header units. The main unit includes means to chop crop material and discharge it into a trailing wagon and feed rollers or the like to deliver material into the chopper unit. A number of interchangeable headers are attachable to the front of the main unit. One type of header is especially designed to pick up and deliver windrowed crop material to the main harvester feed rolls; another type of header is designed to mow, gather and deliver standing grass type crops to the main harvester feed rolls; while still another type of header cuts, gathers and delivers corn or other row crops to the main harvester. Each header unit has considerable weight and is constructed on a basic sub-frame structure in a manner enabling the various types of headers to be interchangeably mounted on the main harvester frame. The headers are mounted for vertical pivotal movement relative to the harvester so they may be disposed at the operating height desired for the particular crop and conditions, and to enable them to be elevated for road transport or the like. One or more springs are usually connected between the header and the main harvester to counterbalance most of the weight of the header and enable it to "float" along the ground. The counterbalancing spring means also facilitates the manual positioning of the header at the desired height. Manual header position adjustments are effected by a control cable or the like extending forwardly from the harvester to within reach of the operator of the towing tractor. The header counterbalancing springs must be adjusted to floatingly support the header in its lowest operating position. As the header is manually raised above the lowest position, the counterbalancing spring or springs become shortened and relaxed and exert progressively less supporting force on the header. Therefore, as the header is raised above its lowest position, the operator must supply progressively more lifting force for each additional unit of distance that the header is raised. Considerable effort is required on the part of the operator to raise the header to its uppermost position, even though the header is suspended in a substantially weightless condition when in its lowest position.

It is an object of this invention to provide sub-frame supporting and adjusting mechanism for a harvester or the like wherein the adjusting force supplied by the operator is constant throughout the entire adjustment range of the sub-frame.

It is another object of this invention to provide sub-frame supporting and adjusting linkage for harvesters or the like employing counterbalancing spring means and mechanism which compensates for variations in spring force occurring between different positions of the sub-frame.

It is another object of this invention to provide sub-frame supporting and adjusting mechanism which is basically rugged, mechanically simple, or small size and capable of production at low cost.

These and other objects and advantages of this invention will be apparent upon reference to the following description and claims taken in conjunction with the accompanying drawing which is a semi-diagrammatic fragmentary side elevational view of a forage harvester having a header sub-frame pivotally mounted on the front end thereof and incorporating sub-frame supporting and adjusting mechanism constructed in accordance with the principles of the present invention.

Referring now to the drawing in detail, the reference numeral 10 indicates, generally, a forage harvester having a main frame 11 on which is journalled a chopping cylinder 12 and upper and lower feed rolls 14 and 15, respectively.

The feed rolls 14 and 15 receive crop material and feed it rearwardly (from left to right as viewed in the drawing) to chopping cylinder 12. The feed rolls and chopping cylinder are enclosed by a housing 16 having an upwardly and rearwardly directed discharge spout 18 which directs chopped material from cylinder 12 into a trailing wagon or the like. The harvester main frame 11 is supported on ground engaging wheels 19 and is provided with the usual draft connection (not shown) by which the harvester may be coupled to a farm tractor or the like. While the forage harvester is depicted in the drawing in semi-diagrammatic form, these machines are well known in the agricultural field. Further details of the harvester unit, per se, are unnecessary to an understanding of the present invention.

The forage harvester carries pivot members 20 (one visible) on the opposite sides of the harvester at the front end thereof for pivotally attaching a header to the harvester. The broken line 21 indicates a portion of the body of a row crop header. Row crop headers, as well as other types of headers, are well known in the art. They sever crops and convey them upwardly and rearwardly to the main harvester feed rolls 14 and 15. Another type of header especially adapted for harvesting grass type crops may be seen in U.S. Patent 3,100,370. The particular type of header and its specific construction details, like those of the operating mechanism of the harvester itself, do not directly enter into the present invention. It is, therefore, to be considered that the header indicated by the broken line 21 may be any of the well known types of headers.

The header is constructed on a downwardly and forwardly inclined sub-frame structure 22. Brackets 24 are carried at the upper rear portion of sub-frame 22 and pivotally embrace the pivot members 20 on the main harvester unit. In this manner the header sub-frame is supported on the main harvester unit for vertical swinging movement from a lower operating position shown in solid lines in the drawing to an uppermost transport position shown in phantom lines. The sub-frame may be positioned anywhere between these two limit positions, as desired by the operator.

Below and rearwardly of pivot members 20, a second pivot member 25 is fixedly provided on the main harvester frame 11. A bell crank lever structure 26 is journalled on pivot 25. Bell crank 26 has one arm 27 extending forwardly from the pivot, or fulcrum, 25 and carries a roller 28 on the forwardmost end thereof. The other arm 29 of bell crank 26 extends vertically upwardly from fulcrum 25. A long coil spring 30 has one end 31 connected to the upper end of the second bell crank arm 29. The other end 32 of spring 30 is anchored to the main harvester frame 11 by a mounting bracket 34. Spring 30 is normally under tension and obviously urges bell crank 26 clockwise about pivot 25 to bias the roller 28 upwardly against a cam 35 which is fixedly carried on the underside of sub-frame 22.

The tension of spring 30 is chosen and adjusted in the conventional manner by adjusting nuts 37 to support the sub-frame in a substantially weightless manner when the sub-frame is in the lowermost position shown in the drawing. This enables the sub-frame to "float" along the contour of the ground when in operation.

A cable 36 has one end connected at 38 to the upper end of second bell crank arm 29. The cable extends rearwardly from arm 29 to, and around, a pulley or sheave 39 journalled on the harvester main frame 11. Cable 36 then extends forwardly to a position within reach of the operator of a tractor connected to tow and operate the harvester unit.

It will be apparent from the drawing that the operator may raise the sub-frame 22 about pivot 20 to any desired height by pulling on cable 36. In actual practice, the forward end of cable 36 is usually connected to a lockable device such as a hand lever equipped with a ratchet segment and locking pawl. As the operator raises the sub-frame 22, and the second arm 29 of bell crank 26 moves clockwise about pivot 25, the spring 30 relaxes thereby exerting progressively less pull on the upper end of lever arm 29. Normally, this would mean that the operator must exert progressively increasing force on cable 36 as the header rises. With the present invention, however, as the first arm 27 of bell crank 26 raises the header sub-frame 22, the roller 28 passes from the flat surface 40 of cam 35 onto the surface 41 of cam 35. The surface 41 of cam 35 is, in effect, an inclined ramp or plane which acts as a wedge to increase the mechanical advantage between the lever arm 27 and the sub-frame 22. Thus, as the counterbalancing force of spring 40 decreases, the cam roller 28 and cam 35 coact to increase the mechanical advantage between the bell crank lever and the sub-frame by an amount proportional to the decrease in spring force. The result is that the operator exerts relatively constant pull on cable 36 regardless of the position of the header when he desires to raise the header to a still higher position. Theoretically, the relatively flat surfaces 40 and 41 of cam 35 should be a continuous arcuate surface to enable the operator to raise the header through its full range with absolutely constant pull on cable 36. The two flat surfaces 40 and 41 interconnected by a standard radius 42 constitute a modified embodiment of the theoretical cam preferred for purposes of mass production. The variations in force required by the operator between the cam 35 shown in the drawing and a precisely calculated and accurately machined compound curve cam surface are not noticeable to a tractor operator in actual practice. In the absence of the spring force compensating cam and roller 35 and 28, it is virtually impossible, and at least difficult and somewhat dangerous, for an operator to raise a heavy harvester header from its operative position to the upper road transport position without stopping the tractor and applying himself fully to the task of raising the header.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A forage harvester comprising a main frame, a sub-frame, pivot means mounting said sub-frame on said main frame for vertical pivotal movement between lower and upper positions, a lever engaging said sub-frame, means fulcruming said lever on said main frame, a spring interconnected between said lever and said main frame and biasing said lever in one direction about said fulcruming means to support said sub-frame in said lower position, the spring force supporting said sub-frame decreasing as said frame rises above said lower position, manually operable means connected to said lever for moving the lever in said one direction to raise said sub-frame about said pivot means, and interengaging cam and cam follower means on said sub-frame and said lever at the point of engagement of said lever with said sub-frame for increasing the mechanical advantage of said lever relative to said sub-frame as the sub-frame raises to compensate for the decrease in the supporting force of said spring.

2. A forage harvester comprising a main frame, a sub-frame, pivot means mounting said sub-frame on said main frame for vertical pivotal movement between lower and upper positions, a lever pivotally mounted on said main frame and having one end engaging said sub-frame, a spring interconnected between said main frame and the end of said lever opposite said one end and urging said lever in one direction to support said sub-frame in said lower position, manually operable means connected to said lever for moving the lever in said one direction to raise said sub-frame about said pivot means, the sub-frame supporting force of said spring decreasing and as said sub-frame is raised above said lower position, and an interengaging cam and roller on said sub-frame and said one end of said lever, respectively, at the point of engagement of said lever with said sub-frame for increasing the mechanical advantage of said lever relative to said sub-frame as the sub-frame is raised above said lower position to compensate for the decrease in the supporting force of said spring.

3. A forage harvester as recited in claim 2 wherein said lever comprises a bell crank structure having a first forwardly extending arm, said one end of said lever being the forwardmost end of said first arm, said bell crank structure having a second upwardly extending arm, said spring extending generally in the fore-and-aft direction and being interconnected between the uppermost end of said second arm and a point on said main frame rearwardly of said second arm.

4. A forage harvester as recited in claim 2 wherein said manually operable means comprises a flexible cable having one end connected to said lever, a pulley journalled on said main frame rearwardly of said lever, said cable extending rearwardly from said lever to said pulley, around said pulley and then forwardly toward the position of an operator of a towing vehicle.

5. A forage harvester comprising a mobile main frame adapted to travel forwardly over the ground, a crop material chopping cylinder on said main frame, feed rolls on said main frame for receiving crop material from a gathering header and feeding said material to said chopping cylinder, a header sub-frame disposed forwardly of said feed rolls, means pivotally mounting said sub-frame on said main frame for vertical pivotal movement relative thereto, a bell crank lever having first and second arms, pivot means rearwardly of said sub-frame mounting said bell crank lever on said main frame, said first arm extending forwardly from said pivot means, a roller journalled on said first arm adjacent the forwardmost end thereof, a cam surface fixedly located on said sub-frame and engaging said roller, said second arm extending upwardly from said pivot means, a spring having one end connected to the upper end of said second arm, said spring extending rearwardly from said second arm and having its other end anchored on said main frame to bias said bell crank lever about said pivot means in one direction and urge said roller against said cam surface to support said header sub-frame, manually operable means including a cable connected to said second arm for pivoting said bell crank lever in said one direction about said pivot means to raise said sub-frame, the sub-frame supporting force of said spring decreasing as said lever is pivoted in said one direction, said cam surface being contoured to coact with said roller to increase the lifting force applied to said sub-frame by said lever as said lever is pivoted in said one direction and compensate for the decrease of said spring force.

References Cited

UNITED STATES PATENTS 2,694,283 11/1954 Waterman _____ 56—208
3,151,429 10/1965 Dyrdahl _____ 56—23

ANTONIO F. GUIDA, *Primary Examiner.*

ABRAHAM G. STONE, *Examiner.*